Jan. 28, 1941.  G. R. ELLIOTT  2,230,048
CONVERSION VALVE
Filed Feb. 19, 1940

INVENTOR.
Gordon R Elliott
BY Robert A. Sloman
ATTORNEY

Patented Jan. 28, 1941

2,230,048

UNITED STATES PATENT OFFICE 2,230,048

CONVERSION VALVE

Gordon R. Elliott, Ferndale, Mich., assignor to Velvac, Inc., Detroit, Mich.

Application February 19, 1940, Serial No. 319,611

11 Claims. (Cl. 303—31)

This invention relates to a conversion valve employed to obtain balanced remote control for a trailer with air suspended power brakes, said brakes being regulated by a tractor equipped vacuum suspended power system. On the other hand a conversion valve of this type is adaptable for trailer brake control of the air suspended type, even though the tractor itself has no vacuum power brakes, but has a control valve for operating said conversion valve on the trailer. As described in my copending application, Serial No. 310,904, vacuum power brake units are of two distinct types; atmosphere and vacuum suspended, both units utilizing vacuum taken off the intake manifold of an internal combustion engine.

When the air suspended power brake unit is inoperative atmospheric pressure is equal on both sides of the brake operating piston. By permitting vacuum from the intake manifold to communicate with one end of the power cylinder, the air on that side of the brake operating piston is withdrawn and air pressure on the other side of the brake piston causes motion thereof, whereby the brakes are applied.

In the vacuum suspended brake system a double line of vacuum is applied to both sides of a brake piston for maintaining brake release. By actuating a control valve air is admitted to one side of the piston forcing the same to move longitudinally, whereby mechanical braking power is obtained. In the present application the power brake system for the tractor is of the latter vacuum suspended type, while the power brake system for the trailer is of the former air suspended type.

The conversion valve hereinafter more particularly described, is utilized whereby the trailer brakes may be remotely actuated at the same time as, or sooner than, the tractor brakes are actuated.

Conversion valves of this type usually consist of chambers bounded on at least one side by an elastic diaphragm, said chambers containing air and vacuum respectively. It is desirable for obtaining a balance in a valve of this type that there be a definite relationship, for instance, between the air pressures in the chambers, and between the degrees of vacuum in the other chambers.

A valve operating stem disposed within a conversion valve of this type is designed for movement whenever there is a lack of balance of pressures between all the chambers. It is the motion of this stem which regulates the operation of the vacuum power brakes.

Heretofore conversion valves of this type have not operated as effectively as desired because no effective means have been employed whereby the balancing chamber of said valve is not affected by vacuum changes in the system.

It is desirable that the vacuum in said balancing chamber be maintained because of the control it has over the valve stem actuating diaphragm hereinafter described, which in turn controls operation of the trailer brakes. By maintaining this vacuum prompt and more completely responsive braking action of the trailer brakes is affected.

In all conversion valves of this type the balancing vacuum chamber is in communication with the vacuum source. As this source is drawn upon to actuate the air suspended brake chambers the vacuum power available must drop, due to the air entering into the vacuum source from said chambers. The net result of a vacuum drop in the aforementioned balancing chamber is that the valve action is not completely responsive but lags. This invention provides a mechanism whereby this drop in the vacuum is prevented at the moment that a drop of vacuum occurs in the vacuum source.

It is the object herein to provide a conversion valve wherein the maximum vacuum in the balancing chamber is constantly maintained whereby a greatly improved valve action is accomplished or obtained.

It is the object hereof to provide means in a conversion valve of this type whereby the vacuum within the balancing chamber may be temporarily cut off from communication with the vacuum source at the moment that said source begins to drop.

It is the further object hereof to provide a novel method employed in a conversion valve of this type whereby a very quick action is obtained.

It is the further object hereof to provide in a conversion valve a balancing vacuum chamber of such interior volumetric content as to reduce air compression therein by operation of the diaphragm which ordinarily would compress what air remains in said chamber. By reducing this compression to a minimum valve action is also increased preventing lag or delay which heretofore has been characteristic of this type of valve.

This invention relates to the various arrangements of parts and combinations thereof hereinafter described by way of example in connection with the appended drawing of which:

Figure 1:
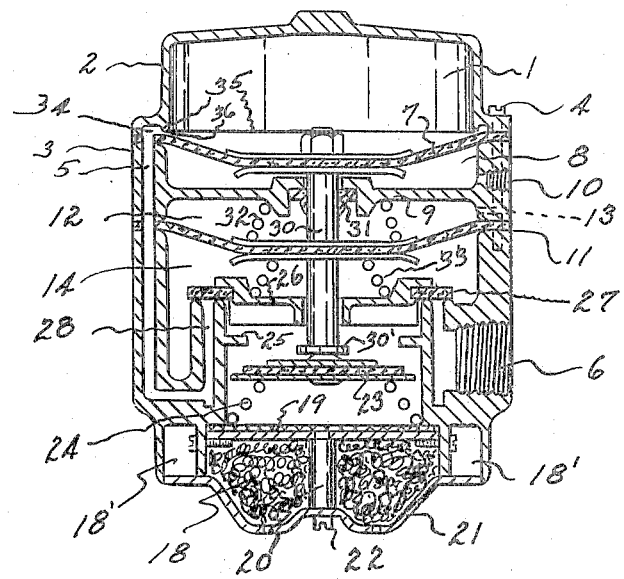
Figure 1 is a sectional elevational view of the conversion valve.
Figure 2:
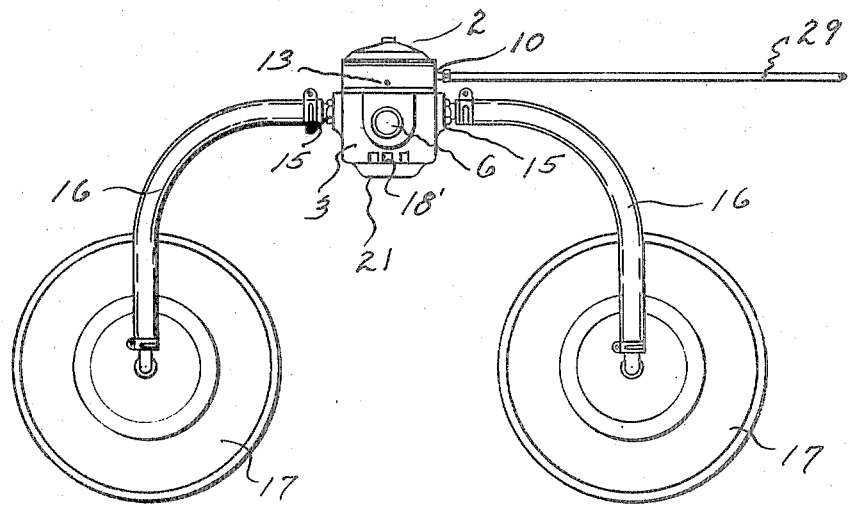
Figure 2 is a side elevational view of the conversion valve assembly with the brake power chambers.

It is expressly understood that the invention is not limited by said drawing, but is intended to cover other adaptations within the scope of the invention teaching various applications of the principles embodied herein.

Referring to the drawing the upper vacuum balancing chamber 1 of the conversion valve defined by the cover portion 2 suitably bolted circumferentially to the valve housing 3 at points 4, communicates with the vacuum tank or other vacuum source by means of a by-pass 5 within said housing, said by-pass in turn communicating with the vacuum inlet connection 6 from said vacuum supply.

Transversely disposed across the open top of housing 3 secured by cover 2 is an elastic diaphragm or disc 7 which resiliently defines vacuum balancing chamber 1. Diaphragm 7 also defines chamber 8 which is further bounded at its bottom by the web portion 9 integral with the valve housing, access being provided thereto through opening 10.

A second diaphragm or disc 11 is likewise secured within the valve housing in spaced relation to the aforementioned web member to define an air chamber 12 open to the atmosphere through openings 13. A fourth chamber 14 communicating with vacuum inlet connection 6 is provided below and adjacent diaphragm 11, said chamber being in direct communication through outlets 15 and conduits 16 to the power chambers 17 of the trailer brakes.

For brake release, chamber 14 directly communicates with the atmosphere through openings 18' in the housing, said openings communicating with a filter 18 retained within the lower portion of valve housing 3 between screen 19 and filter plate assembly 20, said filter being retained by means of the cover member 21 and a suitable bolt 22.

In normal brake release position the seat assembly 23 resiliently positioned upon coil spring 24 is unseated with respect to the laterally disposed annular valve seat 25, whereby air is free to pass upwardly through guide member 26 which retains and journals the hollow valve disc member 27. It will be noted that in brake release position disc 27 is seated upon the annular opening 28 which communicates with the vacuum supply through inlet opening 6, effectively closing off said vacuum supply from chamber 14.

In brake release, balancing chamber 1 is provided with a maximum vacuum; likewise chamber 8 which communicates with the control line 29 through opening 10. Line 29 is connected with a control valve which is manually or otherwise operated within the tractor whereby vacuum is transmitted to chamber 8. It is through this control line also that air or reduced vacuum may be allowed to enter said chamber thereby varying the degree of vacuum therein.

In release position it will be seen that there is a balance of vacuum between chambers 1 and 8, said chambers being connected to the same vacuum supply.

In brake release, chambers 12 and 14 with intermediate diaphragm 11 are similarly balanced, both chambers being in direct communication with the atmosphere.

Stem 30 centrally disposed within housing 3 is slidably journaled through web portion 9 and through a suitable packing seal 31 for reciprocation therethrough. Diaphragms 7 and 11 are fixedly secured to stem 30 for reciprocation therewith, diaphragm 11 being resiliently positioned with respect to corresponding chambers 12 and 14 by coiled springs 32 and 33 respectively.

*Operation*

To apply the trailer brakes it is necessary to temporarily upset the balance obtained in the conversion valve during brake release by admitting air or reduced vacuum through control line 29 into chamber 8. Due to the variation in degree of vacuum between chambers 1 and 8 diaphragm 7 is caused to instantly rise or flex within chamber 1. Diaphragm 11 and stem 30 likewise move in the same direction, stem 30 carrying therewith loosely mounted guide member 26 by means of collar portion 30' and unseating valve disc 27.

Vacuum supply within the annular opening 28 is permitted to enter chamber 14 contemporaneously. Independent seat assembly 23 is permitted to rise under the force of its resilient spring support 24 whereby said assembly effectively registers with seat 25 closing off further air supply to chamber 14. Vacuum power within chamber 14 then becomes available through openings 15 and conduits 16 to the power chambers 17, whereby the trailer brakes are applied.

Application of the brakes brings about a temporary lack of balance within the conversion valve. As vacuum is built up in chamber 14, air pressure in chamber 12 forces diaphragm 11 downward, aided by the resiliency of compressed spring 32. Stem 30 consequently floats downward with valve disc 27 and its support 26 riding upon collar 30' of said stem. It will be noted that due to the resiliency of the diaphragm and springs that valve disc 27 does not seat itself over annular opening 28, nor is disc assembly 23 unseated from seat 25, seat 25 being resiliently supported by spring 24.

At this point a new balance is obtained within the conversion valve with the brakes applied, the vacuum in chamber 14 being again equal in degree to the vacuum in chamber 1.

When it is desired to release the trailer brakes the control line 29 is regulated by control valve whereby vacuum is again supplied to chamber 8 and the existing balance is again temporarily disturbed until a new balance can be obtained between diaphragms 7 and 11.

The vacuum built up in chamber 8 causes further downward movement of diaphragm 8 and also diaphragm 11 and stem 30 connected thereto. Guide member 26 riding in collar 30' of stem 30, causes valve disc 27 to seat over annular opening 28, closing off further vacuum power from chamber 14. Valve seat assembly 23 is unseated from seat 25 by the downward movement of stem 30 whereby air through inlets 18' is allowed to enter chamber 14 as heretofore described.

With air in chamber 14 and in chamber 12 and with equal degrees of vacuum in chambers 1 and 8 balance is again obtained between diaphragms 7 and 11.

Whenever only partial braking is required a mixture of air and vacuum or a limited degree of vacuum is permitted to communicate through line 29 with chamber 8, by partial operation of the control valve.

Thus diaphragm 7 moves upward with less force applied, due to a smaller degree of vacuum differential between chambers 1 and 8. With vacuum permitted to build up in chamber 14, in the manner heretofore described, disc 27 is seated again, as soon as the pressure differential between chambers 12 and 14 is equal to the vacuum differential between chambers 1 and 8. However it will be noted that stem 30 descends only far enough to allow disc 27 to seat but not far enough to unseat disc assembly 23. Partial braking is thus accomplished, because vacuum supply is again cut off from chamber 14 so that said chamber has therein a mixture of air and vacuum, i. e., a reduced degree of vacuum sealed in chamber 14 in communication with the power brake chambers. Consequently at this point a balance is obtained within the conversion valve after the application of the partial braking.

In conversion valves of this type vacuum balancing chamber 1 is continuously in communication with the vacuum supply. Whenever this supply is drawn upon to operate the trailer brakes with power chambers of the air suspended type it is obvious that there will be a drop of vacuum in the vacuum supply due to the air entering into the vacuum source from said brake chambers which in turn would be communicated to balancing chamber 1.

This vacuum drop prevents a prompt and quick upward movement of diaphragm 7 at the moment the air or reduced vacuum is allowed to enter chamber 8 through control line 29.

This invention includes a method and means whereby diaphragm 7 is more readily responsive for actuating the trailer brakes in the manner hereinbefore described, said diaphragm being integral with the mechanism which controls vacuum power to said brakes.

Cover member 2 is provided upon its lower surface with an annular recess 34 which is adjacent to and in communication with by-pass channel 5 whereby in brake release vacuum is free to communicate with chamber 1.

It will be noted also that the annular flange 35 forming a portion of the interior surface of cover member 2 and defining the interior wall of annular recess 34 is adjacent the outer portion of diaphragm 7; but in release position, as shown in Figure 1, is provided with a clearance or opening 36 therebetween for communication between by-pass 5, recess 34 and chamber 1.

At the instant however that air is admitted to chamber 8 through valve controlled line 29 and diaphragm 7 starts to rise, opening 36 is closed by the upper surface of said diaphragm effectively sealing chamber 1 from further communication with the vacuum source.

Thus the vacuum within balancing chamber 1 is maintained at its maximum and a prompt, non-lagging, completely and instantly responsive valve action is obtained for braking application.

It will be noted that there always will be some air in chamber 1 because a perfect vacuum is never effected therein. This air is compressed upon upward movement of diaphragm 7 and therefore must offer resistance to that movement. The invention herein contemplates providing chamber 1 of sufficient volumetric content that this compressive force will have no appreciable effect upon upward movement of diaphragm 7.

Tests have shown that by taking this compressive force into consideration, and providing a large enough interior for chamber 1, that this compression is reduced to a minimum, and valve action is greatly improved and made more completely responsive.

The conversion valve is designed to speed up, for instance, trailer braking, by making the source of vacuum power for operating the brakes in close proximity to the power brake chambers.

The conversion valve housing 3 is provided with separate outlets 15 to which are connected conduits 16 joining the power brake chambers 17. This arrangement provides a more direct communication between the conversion valve and trailer brakes.

Having described my invention reference should now be had to the claims which follow for determining the scope hereof.

I claim:

1. In a conversion valve, a by-pass therein for conducting vacuum to a vacuum chamber into which a diaphragm actuated vacuum regulating valve stem is movable, a cover member defining said chamber and means integral with said cover member with which said movable diaphragm co-operates for intermittently sealing the same from said by-pass.

2. In a conversion valve for air suspended vacuum power brakes, means for conducting vacuum to a vacuum chamber, said chamber being bounded by a movable valve stem actuating diaphragm, a housing confining said chamber, said housing being provided with an annular recessed portion communicating with said means, a diaphragm disposed within said housing adjacent said recessed portion and normally in spaced relation thereto, said diaphragm being movable within said chamber to intermittently seal the same from the vacuum conducting means.

3. In a conversion valve, a housing, a cover member defining a chamber, a by-pass in said housing for conducting vacuum to said chamber, means defining an inlet opening from the by-pass to said chamber, and a reciprocable diaphragm forming a part of said chamber to which is secured a vacuum controlling valve stem, said diaphragm cooperatively registering intermittently with said inlet defining means, for sealing said chamber from said by-pass.

4. In a conversion valve, a by-pass in the housing therefor, a housing cover member defining a vacuum chamber communicating with said by-pass, said chamber being bounded by an axially and reciprocably moveable valve actuating diaphragm, and means integral with said cover member with which said diaphragm co-operatively registers for intermittently sealing said chamber from the by-pass.

5. In a conversion valve, means for conducting vacuum to a chamber into which a diaphragm actuated vacuum regulating valve stem is moveable, a cover member defining said chamber, means integral with said cover member with which said moveable diaphragm co-operates for intermittently sealing the same for said vacuum conducting means, the interior volumetric content of said cover member being such that reduction of that volumetric content by said diaphragm, with consequent vacuum reduction therein, will not retard the free upward movement of said diaphragm.

6. In a conversion valve, a housing therefor, a cover member and a moveable means defining a chamber, means for conducting vacuum to said chamber, means integral with said cover member with which said moveable means co-operates for intermittently sealing said chamber from the vacuum conducting means.

7. In a conversion valve, a housing therefor, a cover member and a moveable means defining a chamber, means for conducting vacuum to said chamber, means integral with said cover member with which said moveable means co-operates for intermittently sealing said chamber from the vacuum conducting means, the interior volumetric content of said cover member being such that reduction of that volumetric content by said moveable means, with consequent vacuum reduction therein, will not retard the free upward movement of said moveable means.

8. In a conversion valve, a housing therefor provided with an opening for conducting vacuum to a chamber, a cover member and a moveable means defining said chamber, means integral with said cover member with which said moveable means co-operates to intermittently seal said chamber from the vacuum conducting means.

9. In a conversion valve, a housing therefor, a cover member defining a chamber, a vacuum controlled valve actuating diaphragm disposed within said housing adjacent a recessed portion therein and normally in spaced relation thereto, forming a part of said chamber, and means communicating with said recessed portion to conduct vacuum to said chamber, said diaphragm being moveable therein to intermittently seal the same from the vacuum conducting means.

10. In a conversion valve, a by-pass therein for conducting vacuum to a vacuum chamber into which a diaphragm actuated vacuum regulating valve stem is moveable, a cover member defining said chamber, and means integral with said cover member with which said moveable diaphragm cooperates, for intermittently sealing the same from said by-pass, the interior volumetric content of said cover member being such that reduction of that volumetric content by said diaphragm, with a consequent vacuum reduction therein, will not retard the free upward movement of said diaphragm.

11. In a conversion valve, a by-pass in the housing thereof, a housing cover member defining a vacuum chamber communicating with said by-pass, said chamber being bounded by an axially and reciprocably moveable valve actuating diaphragm, and means integral with said cover member with which said diaphragm cooperatively registers for intermittently sealing said chamber from the by-pass, the interior volumetric content of said cover member being such that reduction of that volumetric content by said diaphragm, with consequent vacuum reduction therein, will not retard the free upward movement of said diaphragm.

GORDON R. ELLIOTT.